United States Patent [19]

Banks

[11] Patent Number: 4,691,518
[45] Date of Patent: Sep. 8, 1987

[54] VERTICALLY OSCILLATING HEAT ENGINE

[76] Inventor: Ridgway Banks, 7411 Park Vista, El Cerrito, Calif. 94530

[21] Appl. No.: 929,508

[22] Filed: Nov. 12, 1986

[51] Int. Cl.$^4$ .............................................. F03G 7/06
[52] U.S. Cl. ........................................ 60/527; 60/529
[58] Field of Search ................................. 60/527, 529

[56] References Cited

U.S. PATENT DOCUMENTS

| 3,913,326 | 10/1975 | Banks | 60/527 |
| 4,450,686 | 5/1984 | Banks | 60/527 |
| 4,563,876 | 1/1986 | Banks | 60/527 |

*Primary Examiner*—Stephen F. Husar
*Attorney, Agent, or Firm*—Bruce & McCoy

[57] ABSTRACT

A simple nitinol wire powered engine employing a four bar linkage which oscillates the nitinol wire in a vertical plane into and out of a pair of aligned different temperature baths.

5 Claims, 15 Drawing Figures

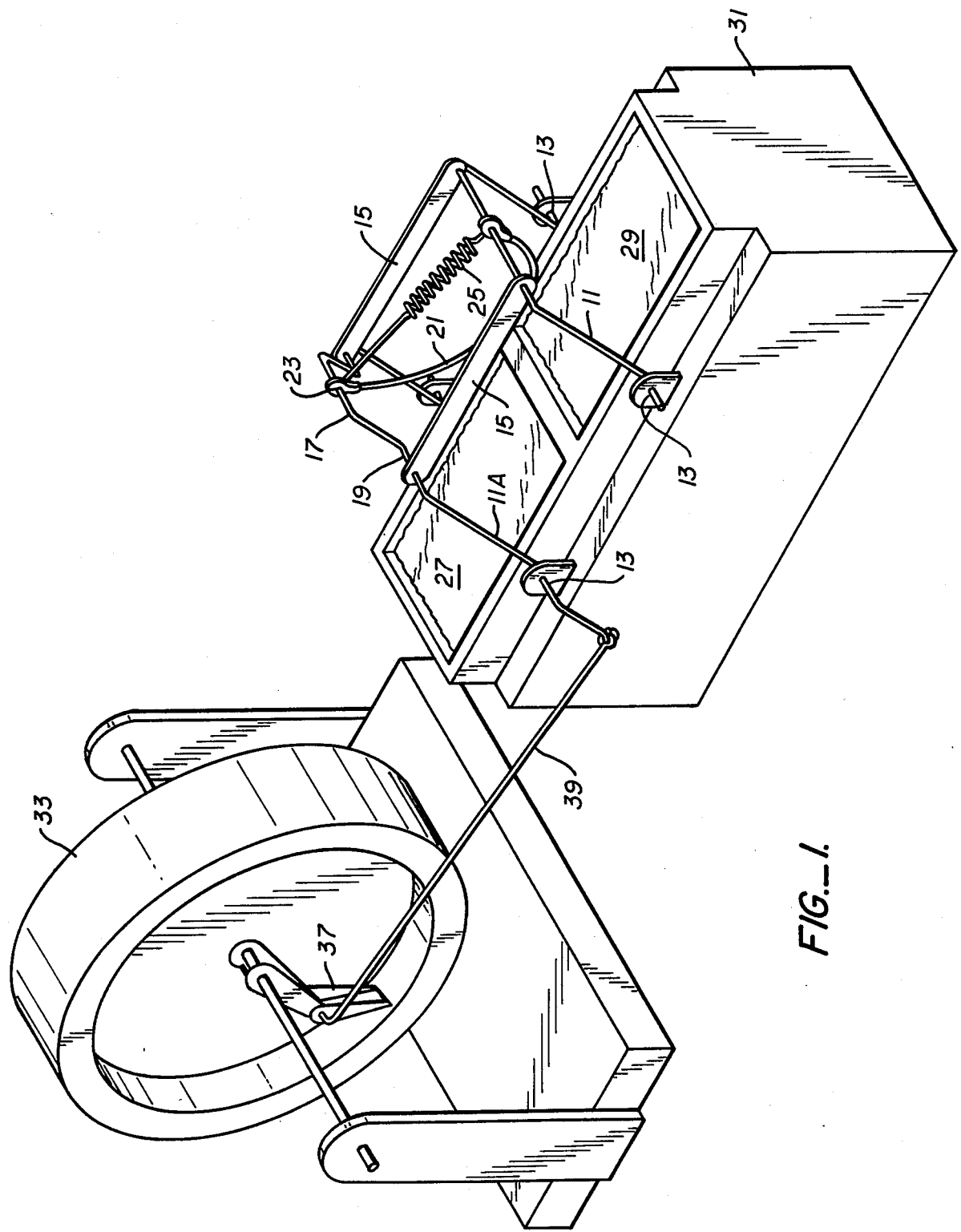
FIG.—1.

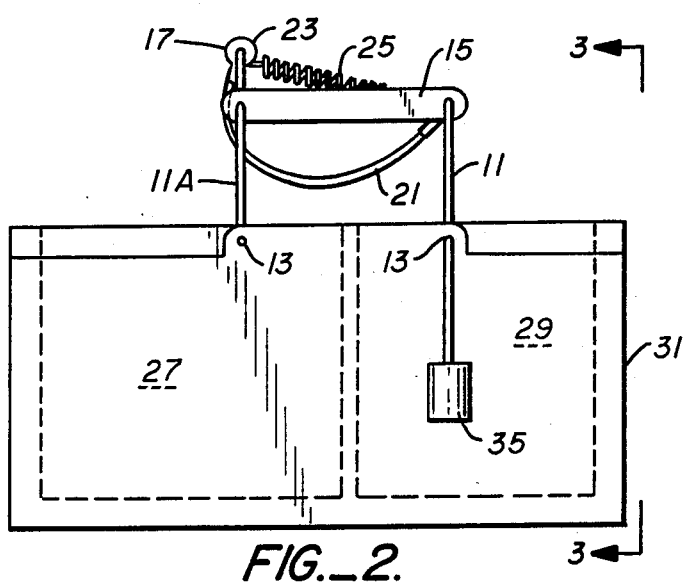
FIG._2.
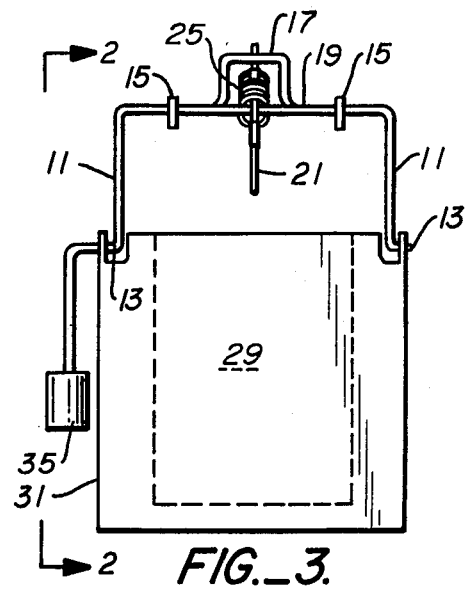
FIG._3.
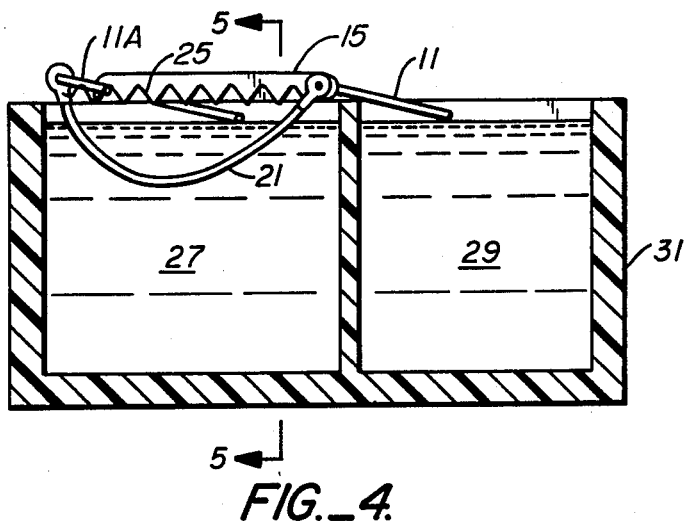
FIG._4.
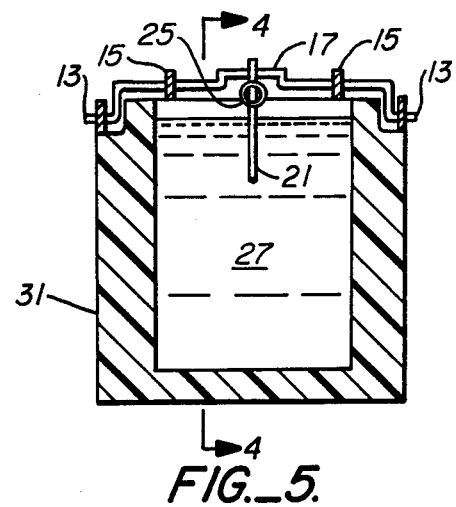
FIG._5.
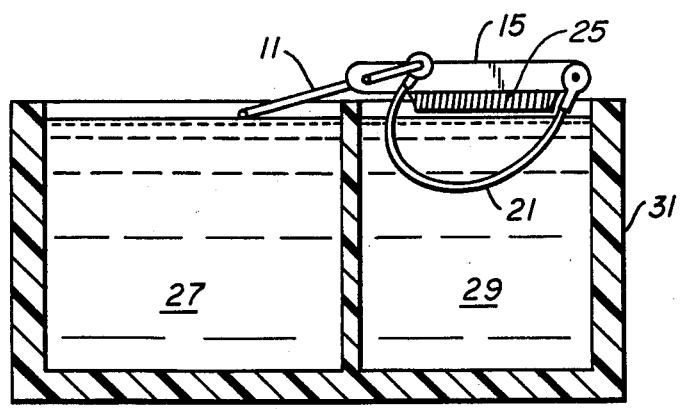
FIG._6.
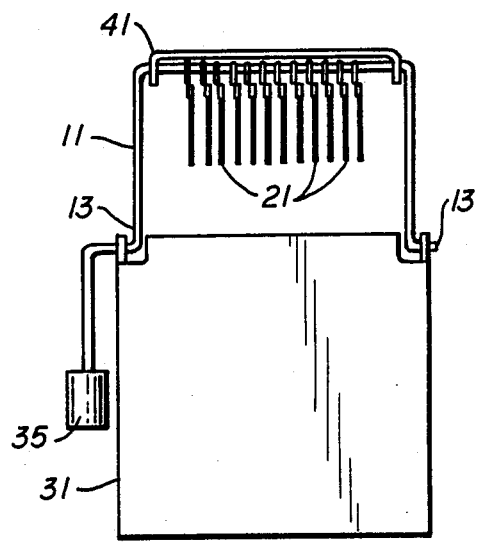
FIG._9.

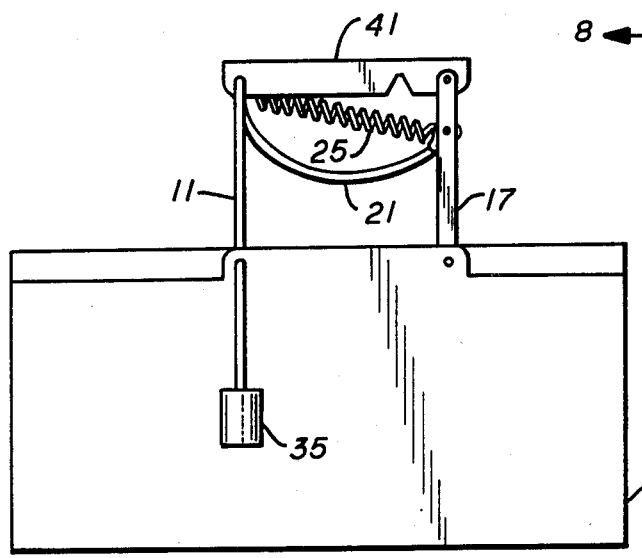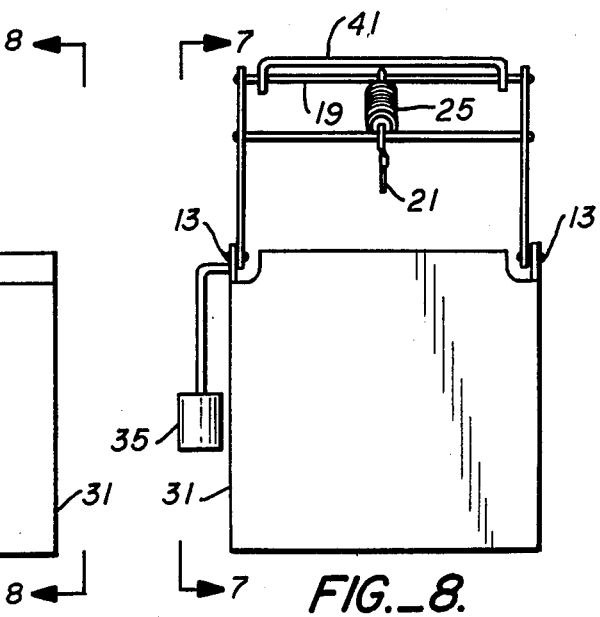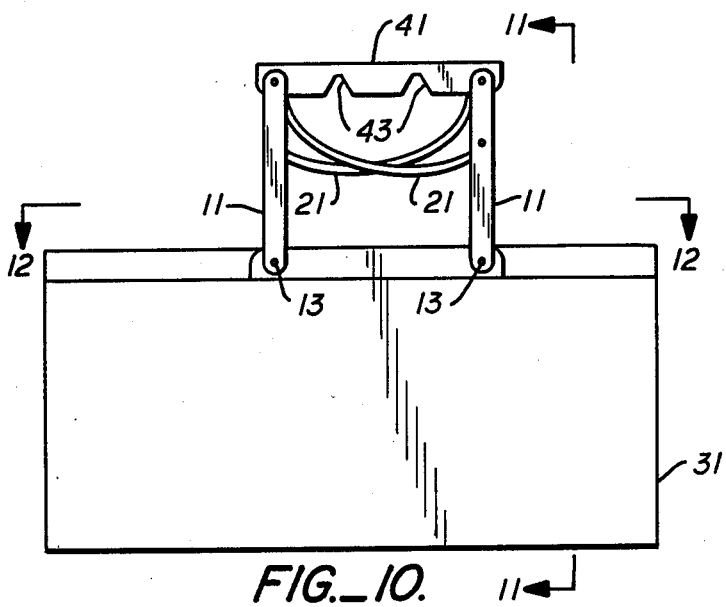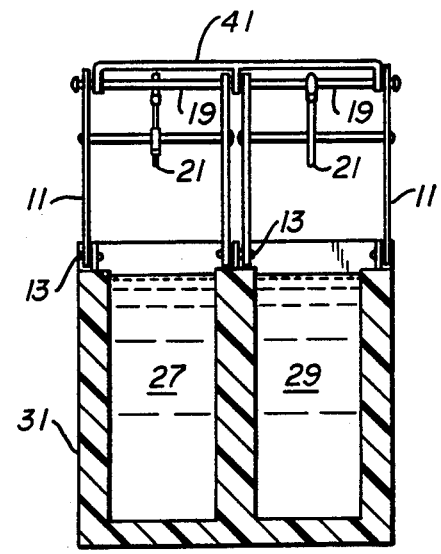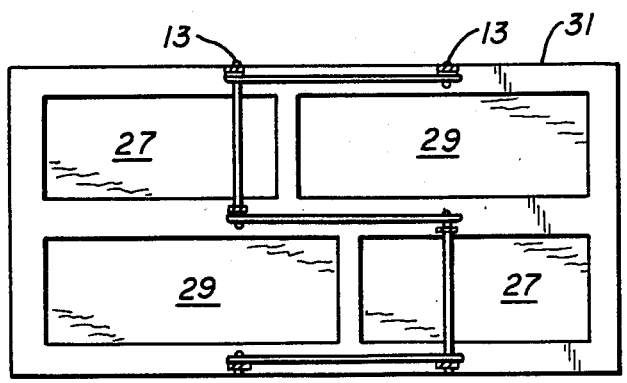

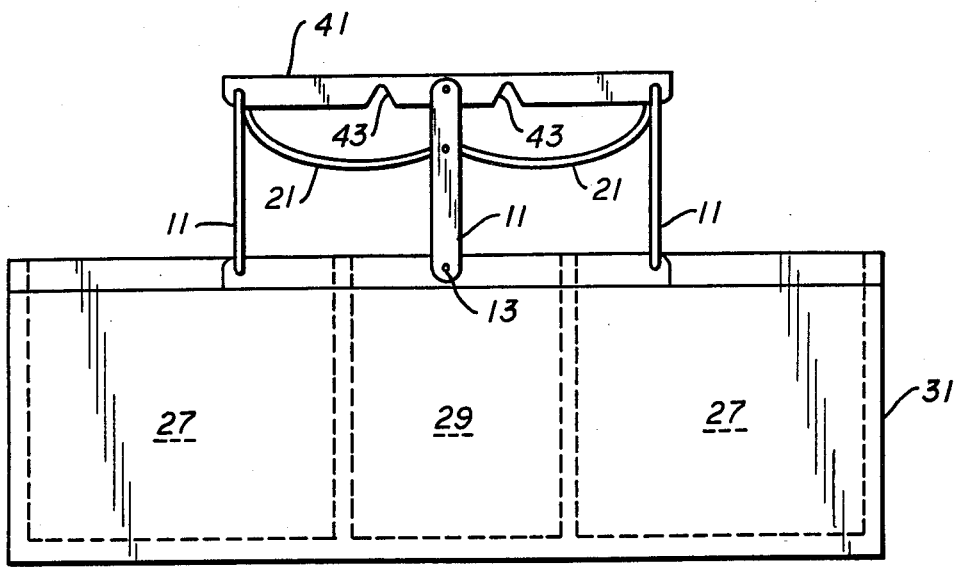
FIG._13.
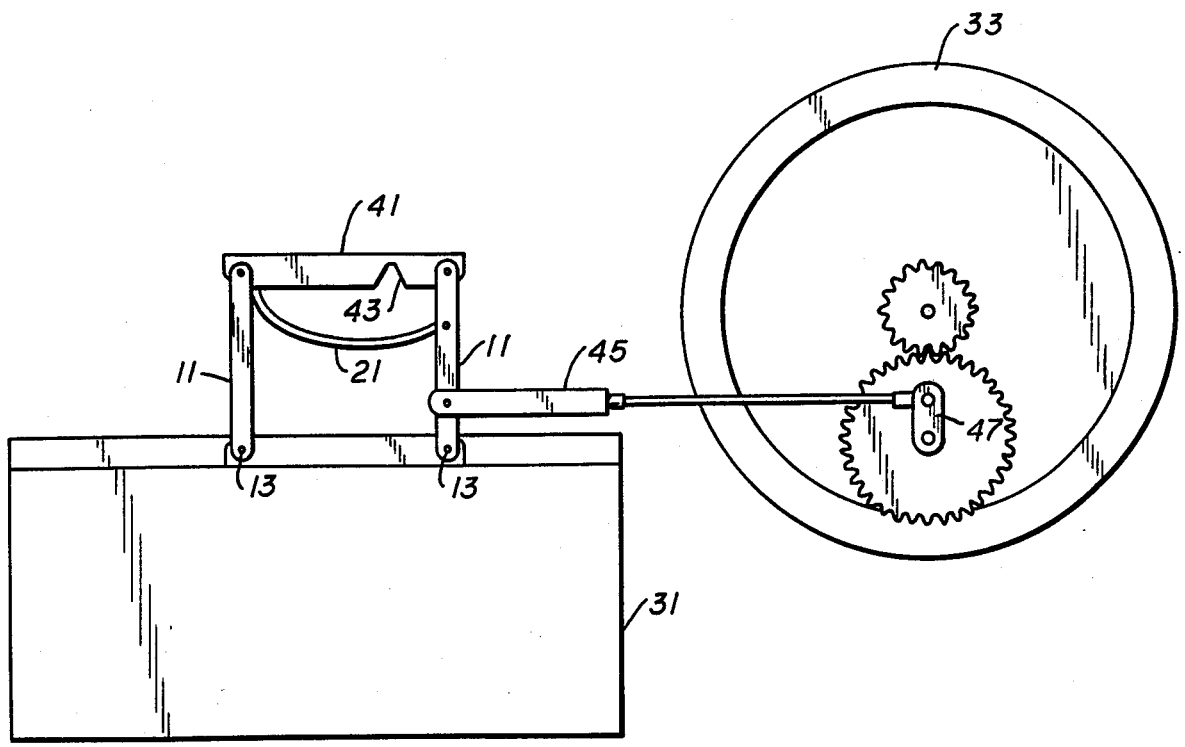
FIG._14.

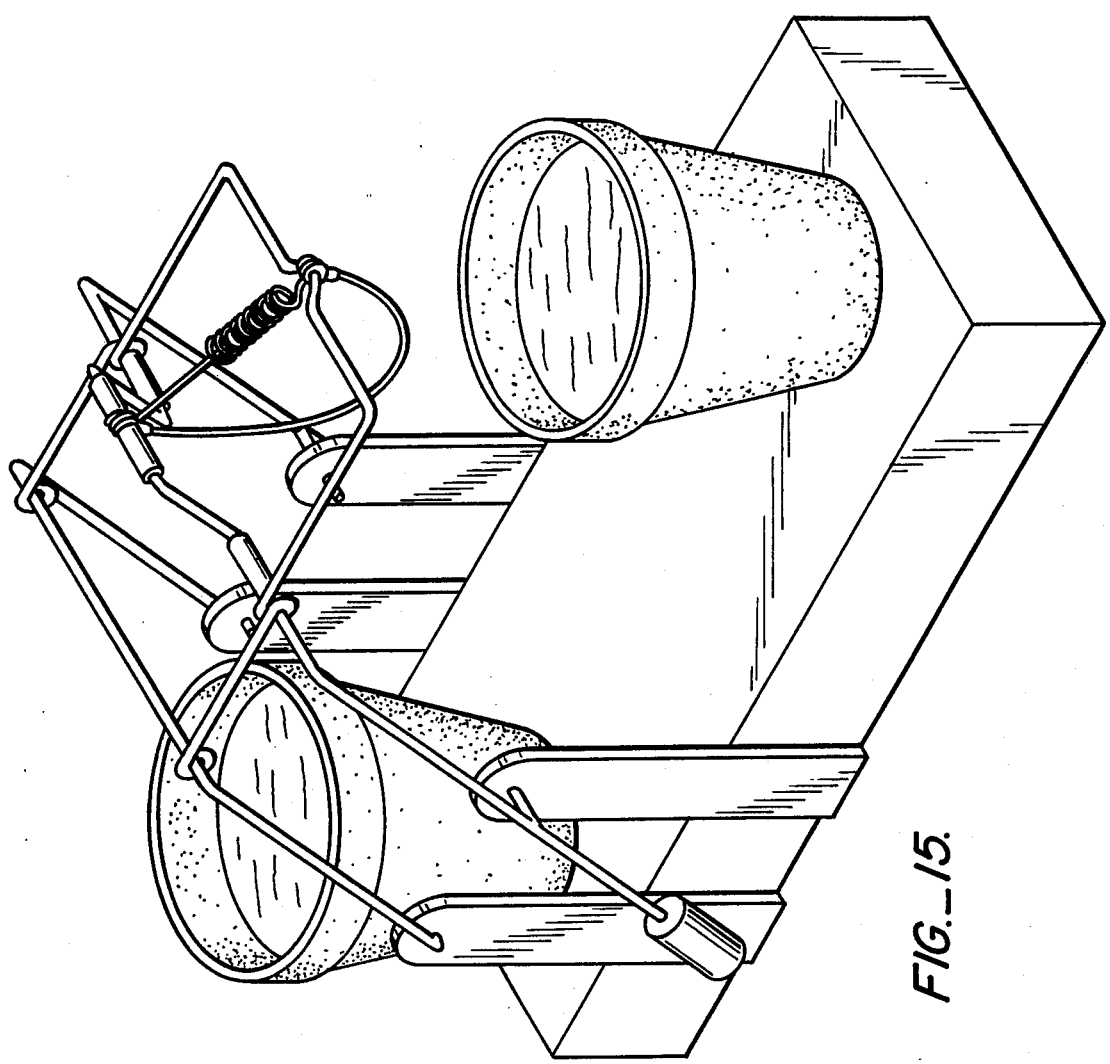
FIG.—15.

VERTICALLY OSCILLATING HEAT ENGINE

BACKGROUND OF THE INVENTION

1. Field of the Invention

The present invention relates to shape memory alloy heat engines and more particularly to a nitinol wire powered vertically oscillating heat engine.

2. Description of the Prior Art

The inventor of the present invention is also the inventor of the Banks Engine, U.S. Pat. No. 3,913,326, for Energy Conversion System, issued Oct. 21, 1975, which employed bent wires and was the first proven reliable nitinol powered engine. The "Background Of The Invention" section of that patent sets forth in part the status of the prior art at the time of that invention. The "Summary Of The Invention" section of that patent describes the thermodynamic working material, which powers the engine, as a thermally responsive memory material, such as nitinol. The same material is used to power the present invention. The thermally responsive materials which demonstrate these thermal response characteristics have come to be known as the shape memory effect class of materials.

Subsequent to the development of the original engine, the inventor developed an improved engine to extract the tensile energy of straight nitinol wire. That engine is disclosed in the U.S. Pat. No. 4,257,231, for Heat Engine, issued Mar. 24, 1981. "The Background Of The Invention" section of that patent sets forth in part the status of the prior art which had developed to the time of that invention. The "Summary Of The Invention" section of that patent describes the problems with extracting energy from straight wires of nitinol or any other thermally responsive shape memory effect material.

In March of 1983, the inventor filed a patent application on a single wire nitinol engine which demonstrated a much lighter and simpler construction than had been known for providing an operable nitinol engine. That application issued as U.S. Pat. No. 4,450,686 on May 29, 1984.

In February of 1985, the inventor filed an application for a linear output nitinol engine which overcame the problems of extracting usable energy from the heat engine disclosed in U.S. Pat. No. 4,257,231. The application resulted in U.S. Pat. No. 4,563,876 for a Linear Output Nitinol Engine, issued Jan. 14, 1986. The "Summary Of The Invention" section of that patent sets forth three particular areas of design in which improvements were disclosed in the patent.

The disclosures of the above referenced patents are incorporated herein by reference for a more complete understanding of the present invention. Additional basic wire powered mechanisms have now been conceived for extracting energy from shape memory materials such as nitinol, and one of these mechanisms is described by the present disclosure. Another wire powered engine is described in the disclosure filed concurrently herewith.

SUMMARY OF THE INVENTION

The prior art engines which employ bent wire drive elements require multiple wires to operate. The present design can operate very effectively with a single bent wire drive element, and the output of the engine can be scaled up almost directly proportional to the number of drive elements utilized. Such power increases cannot be achieved by the prior art bent wire engine designs.

The present invention is a vertically oscillating nitinol wire powered engine which is comprised of a pair of vertically projecting drive posts which are journalled at a fixed distance from each other for at least partial rotational motion about their lower ends. The posts can be rocked back and forth or oscillated about their lower ends in parallel relation. At least one linkage bar interconnects and is journalled to the projecting drive posts. The connection of the linkage bar with the drive posts is equal distant along the posts or at the same height from the journals. The connection length between the posts along the linkage bar is equal to the distance between the journals whereby the posts and the linkage bar and the fixed distance between the journals at the lower ends of the drive posts forms a four bar linkage.

At least one shape memory alloy element is disposed in flexure interconnecting the upper ends of the drive posts. One of the connections of the element with one of the drive posts is disposed at a further radial distance from the journal at the lower end of the drive post than is the other connection of the element with the other drive post.

A means is provided for disposing different temperature baths below the element whereby as the drive posts oscillate about their journals, the element alternatively dips into one bath and then the other. A means is provided to swing the posts between the baths.

OBJECTS OF THE INVENTION

It is therefore an important object of the present invention to provide a new and improved nitinol wire powered engine.

It is also an object of the present invention to provide a heat engine of a very simple single wire design having a direct power takeoff.

It is another object of the present invention to provide a single shape memory alloy wire heat engine which has a very simple construction of a few bent wires and formed metal with virtually no machined parts.

It is a further object of the present invention to provide a demonstration shape memory alloy heat engine which can be operated with hot and cold temperature baths which do not need to be supplied with recirculating fluids.

And it is still another object of the present invention to provide a shape memory alloy heat engine which can be scaled up in power output by simply strengthening the mechanism and adding additional shape memory alloy wire elements.

Other objects of the present invention will become apparent when the description of the preferred embodiment is considered in conjunction with the accompanying drawings.

DESCRIPTION OF THE DRAWINGS

FIG. 1 is a perspective view of a preferred embodiment of the present invention showing the operative mechanism and an energy takeoff and storage means;

FIG. 2 is a side elevation of the shape memory alloy single wire engine of FIG. 1;

FIG. 3 is an end elevation of the engine of FIG. 2;

FIG. 4 is a side elevation in partial section taken along lines 4—4 of FIG. 5 showing the engine with the operative wire element disposed at the end of a stroke in the cold water tank;

FIG. 5 is an end elevation in partial section taken along the lines 5—5 of FIG. 4;

FIG. 6 is a side elevation in partial section taken along lines 4—4 of FIG. 5 showing the operative wire element disposed in the hot water tank;

FIG. 7 is a side elevation of an alternative preferred embodiment of the present invention;

FIG. 8 is an end elevation of FIG. 7;

FIG. 9 is an end elevation of the device shown in FIG. 8 using a multiple wire assembly;

FIG. 10 illustrates an alternative embodiment utilizing two sets of parallel baths and a double operative mechanism;

FIG. 11 is an end elevation in partial section taken along the lines 11—11 of FIG. 10;

FIG. 12 is a top plan view in partial section taken along lines 12—12 of the device of FIG. 10;

FIG. 13 is a side elevation of another alternative embodiment employing aligned baths;

FIG. 14 is an alternative embodiment in side elevation of FIG. 7; and

FIG. 15 is a perspective view of yet a further emobdiment.

DESCRIPTION OF THE PREFERRED EMBODIMENT

The present invention is a heat engine utilizing thermally responsive elements of a shape memory alloy material. More specifically, it is a simple single wire nitinol engine combining the basic principals of my prior engines disclosed in U.S. Pat. Nos. 3,913,326 and 4,563,876 into a highly modified and simplified form.

The thermally responsive nitinol wire element which powers the invention has the memory property characteristic of foreshortening and lengthening its flexure bend when thermally cycled. The nitinol metal is pre-worked in the hot state into a straight wire so that it tends to resume the straight configuration when heated above the phase change temperature. When it is cooled below its phase change temperature, it easily bends to shorten its arc especially when collapsed by a spring or the momentum of the mechanism.

A preferred embodiment of the present invention, which is best described as a vertically oscillating heat engine, is illustrated in FIGS. 1-3. It includes at least a pair of vertically projecting drive posts 11 which are disposed at a fixed distance from each other and journalled for at least partial rotational motion at their lower ends 13. If two pair of drive posts are used as shown in the FIGS. 1-3, the two drive posts journalled on the same side of the base of the machine are spaced apart the same distance as the journal posts on the opposite side of the base of the machine and the posts on opposite sides of the machine are aligned with each other. This arrangement allows the drive posts to be rocked back and forth or to be oscillated about their lower ends in parallel relation.

At least one linkage bar interconnects and is journalled to the projecting drive posts at a point equal distant along the drive posts from the journals. In the preferred embodiment of FIGS. 1-3, a pair of drive links 15 interconnect the upper ends of the drive posts which oscillate. The effective connection length of the linkage bar between the drive posts is equal to the distance along the base between the lower journals. To effect this, the links are journalled on the drive posts with connections equidistant from the lower journals and the links are the same length as the distance between the journals at the lower ends of the drive posts. The posts and the linkage bars and the fixed distances between the journals at the lower ends of the drive posts form a pair of interconnected four bar linkages. As a result of this four bar linkage, the pairs of vertically projecting drive posts and the linkage bars rotate about the lower ends of the drive posts in parallel relation.

In the preferred embodiment for a small engine as illustrated in FIGS. 1-3, the two pair of drive posts 11 are each formed as a pair of posts bent from a single wire. Using two drive posts for each post in the pair provides stability to the design. There is a difference between the two pair of drive posts in that one pair 11A includes an offset crank 17 in the middle of the cross-bar 19 which extends between the two drive posts of a single pair. The arc of rotation of the crank portion of the cross-bar is radially longer than the arc of rotation of the ends of the drive posts 11.

A shape memory alloy wire element 21 is disposed in slight flexure or U-shape interconnecting the top ends of the drive posts 11. One of the connections 23 of the element with the drive posts is at a further radial distance from the journals 13 at the lower end of one of the drive posts than the other connection as a result of being secured to the crank 17. This connection 23 to the crank permits the operative wire element to drive the engine during the power stroke by permitting the distance between the end connections of the operative drive element to increase or expand.

In the engine designs where one or more drive elements thermal cycle in phase, a spring means 25 interconnects the drive posts or the ends of the operative wire element urging them towards each other. The spring collapses the wire element when it is dipped in cold water and its temperature drops below the phase change temperature whereby the wire relaxes. In the designs where multiple wires are employed to cycle out of phase (see FIGS. 10-13), a spring may not be necessary.

Means are provided for disposing different temperature baths below the shape memory alloy element whereby as said drive posts oscillate about their journals, the element alternately dips into one bath and then the other. In the simplest form, two baths 27, 29 are formed in a moldable material which serves as the base 31 for the engine and to which the drive posts are journalled. It is important that a structure be employed which permits the wires to be immersed in the baths as completely as possible, and as quickly as possible, when the temperature change in the wire 21 takes place.

A means is provided to swing the drive posts between the baths. In some multiple element engine designs, this occurs automatically when the wires are thermally cycled out of phase (FIGS. 10-13). In other designs, an energy storage means is required to provide momentum to the apparatus. The energy storage means also absorbs the energy developed by the nitinol wire to provide energy output. In the preferred embodiment shown in FIG. 1, the energy storage means consists of a flywheel 33, but it could, of course, include a pendulum 35 as shown in FIGS. 2-9 or a rotary motion absorption connection and power takeoff means as shown in FIGS. 1 and 14. The energy transfer mechanism of FIG. 1 includes a knee joint kicker 37 which collapses on the wire contraction stroke and extends to engage the internal rim of the flywheel and "kick" it around on the wire extension (pull on the connecting rod 39) stroke. The spring means of the single thermal cycle design can be eliminated if the flywheel is large enough and positively driven as shown in FIG. 14. In its simplest form, the energy storage means can just be a counterweight 35 on one of the drive posts as shown in FIGS. 2–9, but in that form no rotary motion is delivered or output captured.

Reference is made to FIGS. 2–6 for an understanding of how the engine operates. FIG. 2 shows the engine being provided with a counterweight 35 which stores energy and swings the operative wire element between the two water baths. When the engine is at rest, generally the wire will have cooled due to air temperature below its phase change and relax and allow the machine to come to a stable position the middle of its oscillating arc. In this condition, the engine is balanced at neutral and the spring is slightly stretched, but it is not strong enough to overcome the bending resistance of the wire in its cold state and the pendulum weight of the energy absorbing means.

To start the engine, the operative element is dipped in hot water bath 29 as shown in FIG. 6. The operative element 21 immediately changes phase and attempts to straighten out to regain its original straight shape. This flops the mechanism in a counterclockwise direction to the position shown in FIG. 4 wherein the spring is stretched, the wire has straightened as far as it can, and the pendulum is lifted storing energy. As the mechanism moves to its left-hand position, a longer distance exists between the two ends of the operative element as a result of the geometry created by the crank formed in one of the drive posts. Due to the changing geometry caused by the crank, the two ends of the operative drive element 21 are extended furthest apart when the mechanism has rotated counterclockwise to the left which is the position that straightening of the heated memory element dynamically seeks. The two ends of the operative element are closest together when it collapses, so the spring tends to move the mechanism to the right in a clockwise motion.

Thus, as shown in FIG. 4, the wire 21 has been previously heated above its phase change temperature whereby it tried to straighten out and in doing so stretched out the return spring. As soon as the wire is immersed in the left-hand or cold water tank 27, the wire is cooled below its phase change temperature and relaxes whereby it can be bent, and the spring then tends to pull the two ends of the wire and the crank and the tops of the drive posts together which rotates the drive posts up and out of the cold water tank in a clockwise rotation until the operative wire element is then immersed in the hot water as shown in FIG. 6. At this point, the wire is then heated above the phase change temperature and immediately tries to straighten or open and reverse the cycle.

An alternative embodiment which is easier to construct is shown in FIGS. 7 and 8. In that design, the crank offset is achieved by hooking the operative wire element to a cross bar 19 disposed lower on the drive posts 11 rather than to a crank which projects above the ends thereof as shown in FIGS. 1–6. Lowering the crank offset permits the upper links to be formed in the shape of a canopy 41. The cut outs 43 in the sides of the canopy are to clear the cross bar 19 to which the operative element is attached when it is disposed in the clockwise most lowered position. The canopy linkage mechanism 41 provides additional strength to the structure and permits it to be made of a bent sheet metal part rather than a bent wire structure. These are easier and cheaper to form.

FIG. 9 shows a simple arrangement for increasing the power output of the machine, particularly the embodiment of FIGS. 7–14. Multiple wires or operative elements 21 are disposed side by side in the drive mechanism. The need for stronger return springs is eliminated by using a large flywheel.

Yet a further embodiment of the present invention eliminates the need for the energy storage mechanism to move the drive posts between the two rotated positions. In this respect the device shown in FIGS. 10–12 has hot and cold baths which are duplicated so that there are parallel baths but the adjacent baths are of opposite temperatures. This permits the wires to be on opposite thermal cycling schedules whereby as one of them is heated the other is cooled such that the machine is self-propelling and needs no energy storage means to swing the drive posts between the two positions.

The same self-propelling arrangement can be achieved with an aligned design in which there are three tanks in alignment as shown in FIG. 13. The two end tanks would be the same temperature with the middle tank being the opposite temperature.

FIG. 14 discloses a design which illustrates that a power take off 45 can be easily secured to the drive posts 11 of the mechanism. These could turn a crank shaft 47 which could in turn drive the fly wheel 33 that would eliminate the spring by employing a positively engaged energy storage mechanism.

FIG. 15 shows a different embodiment for the structure of the present invention which was the original configuration utilized but subsequently refined into the structure as shown in FIGS. 1–8.

Thus, the present invention is a very simple single wire nitinol engine, and it will be seen from the foregoing description that all the objects and advantages claimed therefor are achieved. While the apparatus of the present invention has been described in considerable detail, many modifications and improvements should be obvious to one skilled in the art. Thus, it is not to be limited to the details as set forth herein except as may be necessitated by the appended claims.

I claim:
1. A vertically oscillating nitinol engine comprising
   at least a pair of vertically projecting drive posts journalled at a fixed distance from each other for at least partial rotational motion at their lower ends whereby said posts can be rocked back and forth or oscillated about their lower ends in parallel relation,
   at least one linkage bar interconnecting and journalled to said projecting drive posts equal distant along said posts from said journals, the connection length along said bar between said posts being equal to the distance between said journals whereby said posts and said linkage bar and the fixed distance between said journals at the lower ends of of said drive posts form a four bar linkage,
   at least one a shape memory alloy element disposed in flexure interconnecting the upper ends of said drive posts, one of said connections of said element with said drive posts being a further distance from the journal at the lower end of the drive post than the other connection of the element with the other drive post,
   means for disposing different temperature baths below said element whereby as said drive posts oscillate about their journals the element alternately dips into one bath and then the other, and means for absorbing a portion of the energy developed by the engine and utilizing it to swing the drive posts from the cold bath to the hot bath.

2. The vertically oscillating nitinol engine of claim 1 within the drive posts include two pairs which oscillate with synchronous motion.

3. The vertically oscillating nitinol engine of claim 1 within at least a second drive engine having some or all of the same elements as called for in claim 1 are interconnected for integrated operation and the drive elements are thermally cycled out of phase to swing the posts between said baths.

4. The vertically oscillating nitinol engine of claim 1 within the means to swing the drive posts from the cold to the hot bath includes an energy absorption and storage means.

5. A vertically oscillating nitinol engine comprising
- at least two pairs of vertically projecting drive posts journalled at a fixed distance from each other for at least partial rotational motion at their lower ends whereby said posts can be rocked back and forth or oscillated about their lower ends in synchronous parallel relation,
- at least one linkage bar interconnecting and journalled to said projecting drive posts equal distant along said pairs posts from said journals, the connection distance between said posts along said linkage bar being equal to the distance between said journals whereby said posts and said linkage bar and the fixed distance between said journals at the lower ends of of said drive posts form a pair of four bar linkages,
- at least one a shape memory alloy element disposed in flexure interconnecting the upper ends of said drive posts, one of said connections of said element with one pair of said drive posts being a further distance from the journal at the lower end of the drive posts than the other connection of the element with the other pair of drive posts,
- spring means interconnecting said drive posts and urging ends of the flexed element towards each other,
- means for disposing different temperature baths below said element whereby as said drive posts oscillate about their journals the element alternately dips into one bath and then the other,
- and energy absorption and storage means to swing the posts between said baths.

* * * * *